United States Patent [19]
Hobby et al.

[11] Patent Number: 5,589,012
[45] Date of Patent: Dec. 31, 1996

[54] BEARING SYSTEMS

[75] Inventors: Gray D. Hobby, Stafford; Bernard A. Riggs, Herndon, both of Va.

[73] Assignee: Systems Integration and Research, Inc., Arlington, Va.

[21] Appl. No.: 392,236

[22] Filed: Feb. 22, 1995

[51] Int. Cl.$^6$ .................................................. C22C 45/10
[52] U.S. Cl. .................... 148/561; 148/403; 148/421; 148/906; 384/912
[58] Field of Search .................... 148/403, 421, 148/561, 906; 420/423; 384/912

[56] References Cited

U.S. PATENT DOCUMENTS

| | | | |
|---|---|---|---|
| 4,555,186 | 11/1985 | Scruggs | 384/93 |
| 4,564,396 | 1/1986 | Johnson et al. | 148/403 |
| 4,725,512 | 2/1988 | Scruggs | 428/678 |
| 5,137,792 | 8/1992 | Hodes et al. | 384/912 |
| 5,204,191 | 4/1993 | Dubois et al. | 384/912 |
| 5,288,344 | 2/1994 | Peker et al. | 148/403 |
| 5,368,659 | 11/1994 | Peker et al. | 148/403 |

OTHER PUBLICATIONS

Peker, A. et al., "A Highly Processible Metallic Glass . . . ", Applied Physics Letters, V. 63, No. 17, 25 Oct. 1993.
"New Amorphous Alloys Offer High Strength, Low Density", Advanced Materials and Processes, Sep. 1994.
Kinder, J., "Materials for Rolling Element Bearings," paper from Seminar of Institution of Mechanical Engineers, 16 Nov. 1990.
Wilson, W. H., "Why so Many Bearing Materials?", paper presented at 7th Cheltenham Bearing Conference, 29 Oct. 1986.
ASM Handbook, vol. 2, pp. 804–821, "Metallic Glasses", ASM, 1990.
Thakoor, A. P., et al., "Refractory Amorphous Metallic . . . Coatings on Steeel Substrates", J. of Applied Physics, v. 58, No. 9, 1 Nov. 1985.

*Primary Examiner*—George Wyszomierski
*Attorney, Agent, or Firm*—Edward J. Cabic

[57] ABSTRACT

Bearings are made having at least one surface made of an amorphous alloy having a coefficient of friction of less than 0.5 and having a tensile strength of 1.0 GPa or greater. In the case of a bearing shaft, the shaft can be smaller than a comparable steel shaft. Articles can be fabricated by heating the amorphous metal to a temperature above its plastic flow temperature and below its crystallization temperature so that it is flowable. The heated material is molded or formed into a desired shape and then the molded article is cooled to its metastable, amorphous state. A preferred configuration for the bearing shaft is in a parabola of revolution form so it acts as a thrust bearing.

28 Claims, 5 Drawing Sheets

BEARING SYSTEMS

BACKGROUND OF THE INVENTION

1. Field of the Invention

This invention relates to rotating bearing systems made of amorphous metallic alloys.

2. Description of the Previously Published Art

Design of a rotating mechanical system involves a constant trade-off of materials and geometries to balance the requirements of energy available versus static, dynamic, and friction loads.

Ball bearings provide the best friction performance because the device is operating in the regime of rolling versus sliding friction. However, the tangential points of the balls on a shaft represent stress concentrations because the load on the ball is distributed over a very small area; specifically, the tangential point of the ball which comes in contact with the bearing race. Depending on the particular material, the stress concentration can evolve into grooved races, grooved shafts, and flattening of the balls. These phenomena in turn lead to corrosion, spalling, galling and eventual failure of the bearing. Moreover, a tight tolerance., well matched and balanced ball bearing is difficult to manufacture, and in some cases requires hand selection of the constituent balls.

Journal bearings, on the other hand, provide a large area for load distribution which overcomes the grooving, spalling and flattening problems associated with ball bearings. However, a journal bearing operates in the regime of sliding friction which results in more mechanical losses than rolling friction due to the higher contact area. Lubrication will, of course, minimize the friction issues, within some limits such as viscosity, load density, and surface clearance, but this requires care to ensure that the journal surfaces remain clean and well lubricated. Improper lubrication or decreased cleanliness of the mating surfaces of a journal bearing creates a potential for catastrophic bearing failure due to heat build-up. Consequently, a material that possesses an intrinsically low coefficient of friction, on the order of a ball bearing, and the strength of a journal bearing, and requires no lubrication, would represent a significant engineering advance.

Journal bearing surfaces made of amorphous alloys are briefly described in terms of composition in U.S. Pat. No. 4,555,186 to D. M. Scruggs. The journal bearings in this patent are for use under heavy loads in rolling cone rock bits. The lower load bearing engaging surfaces of the main and secondary journal bearing areas of the mounting pin and the thrust loaded bearing surfaces of the pin are coated with or have attached thereto a layer of an amorphous metal. The amorphous compositions listed have the predominant constituents being W, Nb, Co, Re, Ru, Fe and Mo with a crystallization temperature above 600° C. The bearings made of this material require lubrication. These amorphous compositions listed do not contain zirconium and there is no recognition of any possibility of molding the materials due to any plastic flow properties at temperature lower than the 600° C. crystallization temperature. The Scruggs patent fails to describe how these material can be obtained in large, bulk quantities. Although Vicker Harness Numbers are given for 13 compositions, there are no examples given to show that any large bearing structures were ever made with any of these amorphous materials.

The problem with using amorphous metals is that it is difficult to make them in large quantities so that relatively large structures such as journal bearings can be made. The common impediment to large scale production of amorphous metals is the requirement to very rapidly cool the metal during the formulation process so that it remains amorphous. Therefore, bulk production of the amorphous metals by this technique does not appear to be presently possible.

U.S. Pat. No. 4,564,396 to W. L Johnson and R. B. Schwartz describes metastable amorphous or fine crystalline materials that are formed by solid state reactions by diffusion of a metallic component into a solid compound or by diffusion of a gas into an intermediate compound. However, this approach will result in amorphous metal rods limited to 15 mm diameter. This limits the amount of material that can be molded and does not support the manufacturing process intended for this application.

3. Objects of the Invention

It is an object of this invention to provide low friction bearings surfaces.

It is a further object of this invention to provide low friction applications for amorphous metal compositions.

It is a further object of this invention to provide low friction applications for amorphous metal compositions. requiring no organic lubrication.

It is a further object of this invention to provide low friction applications having at least amorphous metal compositions on the contacting surfaces.

It is a further object of this invention to provide low friction journal bearings using amorphous metal compositions.

It is a further object of this invention to provide bearings made of an amorphous alloy having a coefficient of friction of less than 0.5 and having a tensile strength of 1.0 GPa or greater.

It is a further object of this invention to provide bearings made of an amorphous alloy having a shear modulus of at least 30 GPa and a Youngs modulus of at least 80 Gpa.

It is a further object of this invention to provide bearings made of an amorphous metal which is moldable at a plastic flow temperature which is less than the crystallization temperature.

It is a further object of this invention to provide bearings made of an amorphous alloy which is homogeneous and isotropic with no significant defects such as dislocations, inclusions, or grain boundaries so as to be resistant to cracking and to failure under load.

It is a further object of this invention to provide a significant decrease in manufacturing complexity of bearings due to the ability of this material to be injection moldable without loss of performance.

It is a further object of this invention to provide a method to make an article of an amorphous alloy by molding or forming it at a temperature below its crystallization temperature.

These and further objects of the invention will become apparent as the description of the invention proceeds.

SUMMARY OF THE INVENTION

In structures having two surfaces in moving frictional contact, improved contact can be made by providing at least one of the surfaces with an amorphous alloy having a coefficient of friction of less than about 0.5 and having a high tensile strength of about 1.0 GPa or greater. A major example of such surfaces are in bearings. As used herein, and as in its conventional meaning, a bearing is a device that supports, guides and reduces the friction of motion between fixed and moving machine parts. These surfaces and bearings such as journal bearings can be made using amorphous metal alloy compositions without the need for additional organic lubrication. These amorphous metal alloy compositions have a coefficient of friction like that of teflon of about 0.1 which is quite low and near the level of the coefficient of friction for ball bearings of about 0.05. The amorphous metal alloys have a load capacity equivalent to, or greater than, that of ball bearing systems.

A significant advantage of these amorphous metal alloys is their inherent moldability due to the high difference in temperature ($\Delta T$) between the plastic flow temperature and the crystallization temperature. Manufacturing costs can be reduced by choosing materials that have a $\Delta T$ of at least about 10° C., more preferable at least about 50° C., and most preferably at least about 140° C. This property allows the material to be heated to a temperature where it is flowable which is far below the temperature at which it crystallizes. The material in the flowable condition can be precision injection molded and cooled to the metastable or amorphous state which is the normal operating form. The material properties such as its strength and the ability to be injection molded allows for close tolerance between bearing surfaces and provides for a tremendous increase in the ability to produce superior products compared to similar components made of steel because the amorphous metal requires no machining. The shaft for bearings can be reduced in diameter as will be shown in the calculations below and there will be a reduction in the power loss due to the friction load.

The preferred beryllium containing amorphous metal alloy compositions are described by Peker et al in U.S. Pat. No. 5,288,344 and in an augmented division U.S. Pat. No. 5,368,659 and the entire contents of these two patents are incorporated herein by reference. An especially preferred amorphous metal composition is $Zr_{41}Ti_{14}Cu_{13}Ni_{10}Be_{22}$ which has a favorable $\Delta T$ of about 150° C.

When using conventional journal bearings with a rotating cylindrical shaft, a preferred improved embodiment according to the present invention is to mold the shaft in the form of a parabola of revolution so that it also acts as a thrust bearing.

DESCRIPTION OF THE PREFERRED EMBODIMENTS

Figure 1:
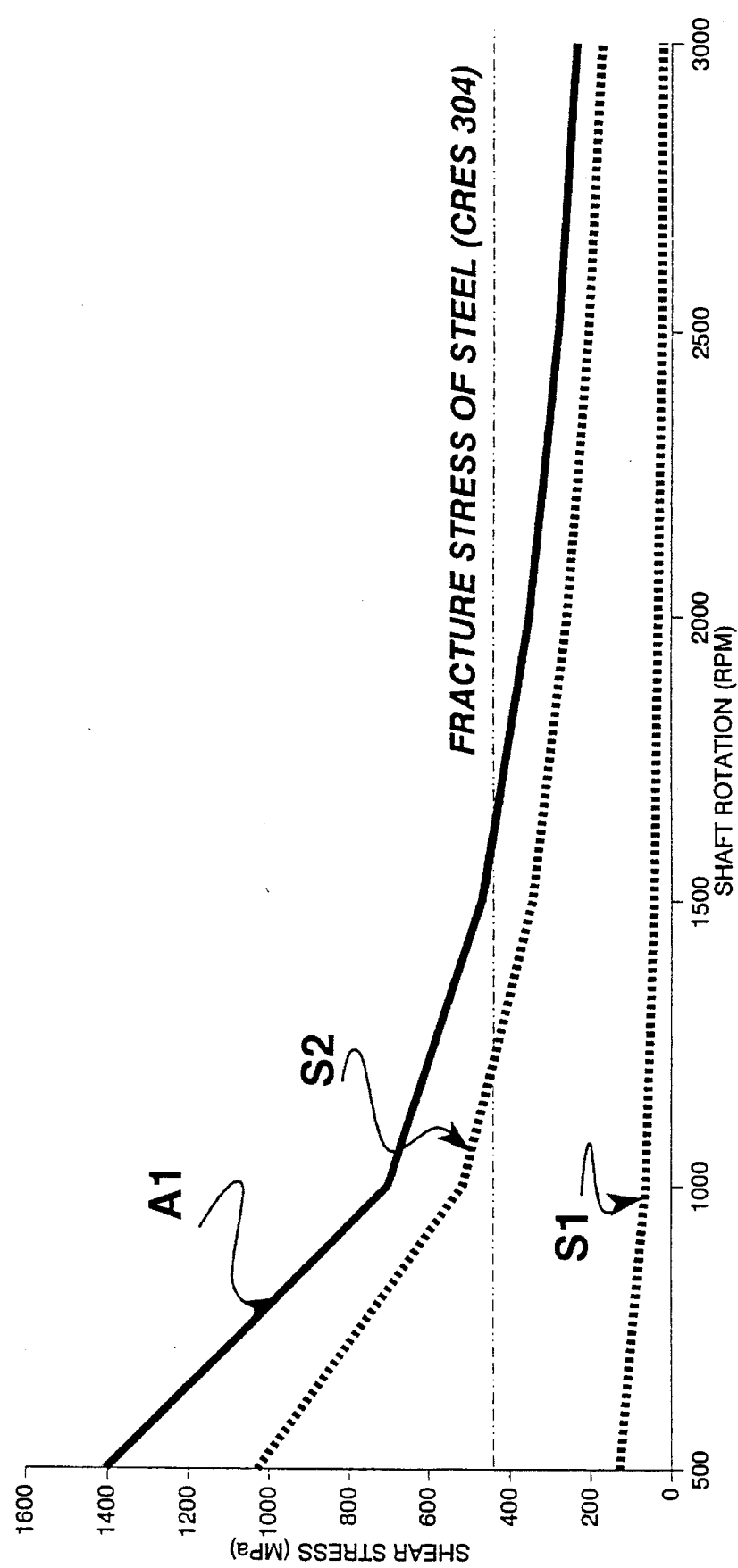
FIG. 1 is a graph of comparative shear stress.

Peker et al in U.S. Pat. No. 5,288,344 and in an augmented division U.S. Pat. No. 5,368,659 describes beryllium containing amorphous metal alloy compositions. They are metallic glass formed of an alloy having the formula

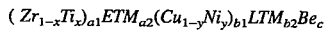

$(Zr_{1-x}Ti_x)_{a1}ETM_{a2}(Cu_{1-y}Ni_y)_{b1}LTM_{b2}Be_c$ where x and y are atomic fractions, and a1, a2, b1, b2 and c are atomic percentages, and wherein:

ETM is at least one early transition metal of V, Nb, Hf and Cr, wherein the atomic percentage of Cr is not more than 0.2 a1;

LTM is a late transition metal of Fe, Co, Mn, Ru, Ag and Pd;

a2 is in the range of from 0 to 0.4 a1;

x is in the range of from 0 to 0.4; and y is in the range of from 0 to 1; and (A) when x is in the range of from 0 to 0.15;
  (a1+a2) is in the range of from 30 to 75%,
  (b1+b 2) is in the range of from 5 to 62%,
  b2 is in the range of from 0 to 25%, and
  c is in the range of from 6 to 47%; and (B) when x is in the range of from 0.15 to 0.4;
  (a1+a2) is in the range of from 30 to 75%,
  (b1+b2) is in the range of from 5 to 62%,
  b2 is in the range of from 0 to 25%, and
  c is in the range of from 2 to 47%.

An especially preferred amorphous metal composition is $Zr_{41}Ti_{14}Cu_{13}Ni_{10}Be_{22}$.

Excelling over other amorphous metals in performance for this application, these materials have unique desirable properties. Specifically, they are homogeneous with no defects such as dislocations, inclusions, or grain boundaries which gives it great resistance to cracking and to failure under load as sometimes occurs with other metals due to inter-material grain cracking. These materials exhibit high tensile strengths of 280,000 psi (1.9 GPa) which is stronger than stainless steel. The Young's Modulus is 95 Gpa, demonstrating deformation resistance equivalent to approximately half that of stainless steel. The alloys have a density of about 5.85 g/cm$^3$ which is 2 g/cm$^3$ or 20% less than stainless steel. This material is injection moldable for fabricating structures and it has an inherently low shrinkage during the transition to and while in the metastable state.

To facilitate the design and production of this device, the preferred material should be produced in ingots of about 200 grams that can be further combined via plastic flow into near-final geometry (more than one ingot may be required for any individual molding application, so the ingots must continuously flow together without dislocations or faults). Material densities on the order of 5 g/cm$^3$ will reduce overall mass of the bearing and reduce torque loads. Shear moduli in the vicinity of 30 GPa or greater will be acceptable provided ultimate tensile strength can be maintained above 1.0 and preferably above 1.4 GPa. The coefficient of friction should be less than 0.5, preferably less than 0.2, and most preferably less than or equal to 0.1. Fabrication of the bearing is facilitated by as large a temperature difference as possible between the material crystallization temperature and the glassification temperature (the temperature at which plastic flow commences).

Bearing structures necessary to carry static and dynamic Loads also carry with them a penalty in terms of friction loads at rotating interfaces. Generally, the forces and energy levels for which the system must provide can be broken into two categories:

(1) Inertial forces (torque required to initiate rotation and overcome static friction forces) and (2) Static and Kinetic friction (losses due to the resistance within the operating system)

Rotating motion of a mechanical system requires torque to initiate rotation and energy to maintain the motion. When one examines the forces required, they can be broken into inertial forces (those forces required to overcome moments of inertia for shafts and loads) and friction forces (those friction forces that must be overcome to initiate rotation). Once acceleration of the shaft and load has been accomplished, then one must consider the energy required to maintain motion as well as the power lost due to friction loads within the rotating system.

The inertial and friction forces operating within the system can be characterized as follows:

$$T_{total} = T_{shaft} + T_{load} + T_{friction}$$

where $T_{total}$=total torque $T_{shaft}$=shaft torque $T_{load}$=load torque $T_{friction}$=friction torque The inertial torque is made up of the shaft torque and the load torque.

For the most part, the inertial force required is application specific. That is, the force required to accelerate the load will generally be significantly more than to accelerate the system shafting. Moreover, the inertial starting forces are several orders of magnitude less than the frictional forces, and as such are ignored for the remainder of this analysis. However, if one operates on an energy budget that limits the motive force available, then even trivial savings such as the torque requirement to accelerate a shaft may be pertinent. For a solid, axially rotating shaft, the torque is given by:

$$T_{shaft} = I_s \dot{\omega}_s$$

where $I_s$=shaft moment of inertia (measure of the mass distribution of material in the solid body)

$\dot{\omega}_s$=angular acceleration using $\rho_s$=material density $r_s$=shaft radius $l_s$=shaft length and where for a shaft $$I_s = \frac{1}{2} m r_s^2$$

and $\dot{\omega}_s$=angular acceleration in radians per second per second the shaft torque equation becomes $$T_{shaft} = \frac{1}{2} m_s r_s^2 \dot{\omega}_s$$

since m for a shaft=$\pi r_s^2 l_s \rho_s$ $$T_{shaft} = \pi/2 \, \rho_s r_s^4 l_s \dot{\omega}_s$$

As seen from this shaft torque equation the predominant factor affecting the shaft torque requirement is the radius of the shaft.

The friction forces operating within the system are defined by $$T_{friction} = C_f W r_s$$

where

| $C_f$ | = | coefficient of friction |
| --- | --- | --- |
| $W$ | = | weight of the shaft and load |
|  | = | weight$_{shaft}$ + weight$_{load}$ = $W_s + W_{load}$ |

By substituting material density times the material volume for weight (which is a convenient engineering tool since materials are tabulated by density) the relation becomes:

$$T_{friction} C_f [(\pi r_s^3 l_s \rho_s) r_s W_{load}]$$

Again we see that the predominant factor in friction torque loading is the radius of the shaft.

Once acceleration of the system has been accomplished, prime mover energy will maintain motion of the shaft and load (which will be application specific), and will be required to make up power lost due to friction within the system. The friction power loss for a shaft is given by "Eshbach Engineering Fundamentals" 1990 4th Edition, B. T. Tapley, editor. pg 3–58 as:

$$P_{lost} = (2\pi n C_f W r_s)/12$$

since $W = W_s + W_{load}$ $$P_{lost} = \pi/6 n C_f [(\rho_s \pi r_s^3 l_s + r_s W_{load}]$$

where n=rotation rate in rpm

Here again, the predominant factor is the shaft radius.

The conclusion, then, is that mechanical savings can best be accomplished by selection of a material that will permit shaft radius reduction while still providing the strength to operate under design load. With a smaller radius r the power lost due to friction will be significantly reduced.

Friction forces operating on the bearing dramatically outweigh the inertial forces by several orders of magnitude. Hence, the bearing design should focus on minimization of the friction loads that the bearing sees (friction starting torque and power loss due to friction). As has been shown, both these are predominantly driven by the radius of the bearing shaft. However, reduction of shaft radii leads to an increase in the shear stress felt by the shaft. This is shown in FIG. 1 which is a graph of comparative shear stress for 1 inch versus 0.5 inch radius shafts. This data was calculated based on loads driven by a 200 hp prime mover on a 3 inch long shaft accelerating through 500 rpm to 3000 rpm. Curve S1 is the shear stress on a 1 inch radius steel shaft. The fracture stress for corrosion resistant steel (CRES 304) is shown as a dotted line and it is at a value of 550 MPa. The steel shaft with the 1 inch radius is within acceptable conditions of the rated load of the system below that line. However, if the radius of the steel shaft is reduced to 0.5 inch, then the shear stress curve S2 extends up above the fracture stress level for steel and is not acceptable; a stronger material must be used.

The amorphous material shaft having a diameter of 0.5 inch is shown in FIG. 1 as line A1. It satisfies this requirement because it has a yield strength safely above the maximum shear stresses imposed.

Figure 2:
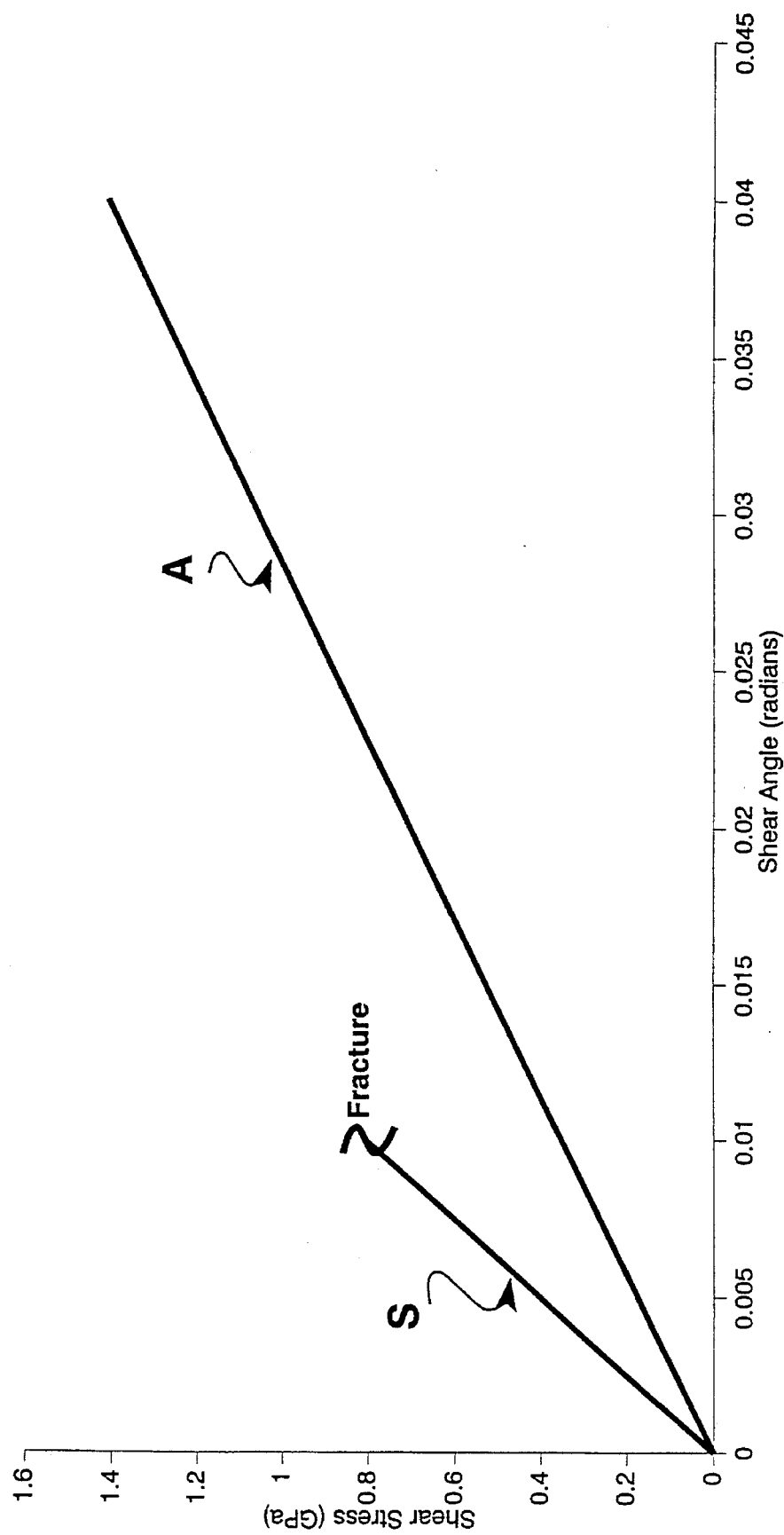
FIG. 2 is a graph of shear strength.

The shear strength of the amorphous metal relative to that of steel is shown in FIG. 2, where the line S is for steel with a shear modulus, G, of 80.7 GPa. It has a fracture at a shear stress of 0.550 GPa. The amorphous metal used in the present invention is labelled A and it has a shear modulus, G, of 35.19 GPa. This material constant reflects that the amorphous material will undergo larger linear elastic distortion than the steel shaft. This larger distortion, manifested as shaft flexure under stress, will not degrade shaft performance in this application. Because the shaft is totally confined, the primary design consideration is final fracture stress.

From the two curves in FIG. 2, it is seen that the amorphous metal shaft could support the loads required and still accommodate a 50% reduction in shaft radius. This is evident because the final fracture stress is 1.9 GPa, safely above the 1.4 GPa shear stress imposed by the shaft radius reduction as shown for line A1 in FIG. 1.

The correlation between shear modulus and Youngs' modulus is:

$$G=E/(2(1+v))$$

where
G=shear modulus
E=Young's Modulus
v=Poisson ratio which is 0.35 for the amorphous metal
thus G=E/2.7

For materials having a shear modulus of 30 GPa the Youngs modulus will be about 81 and thus the material can be characterized as having a Youngs modulus of at least 80 Gpa.

Figure 3:
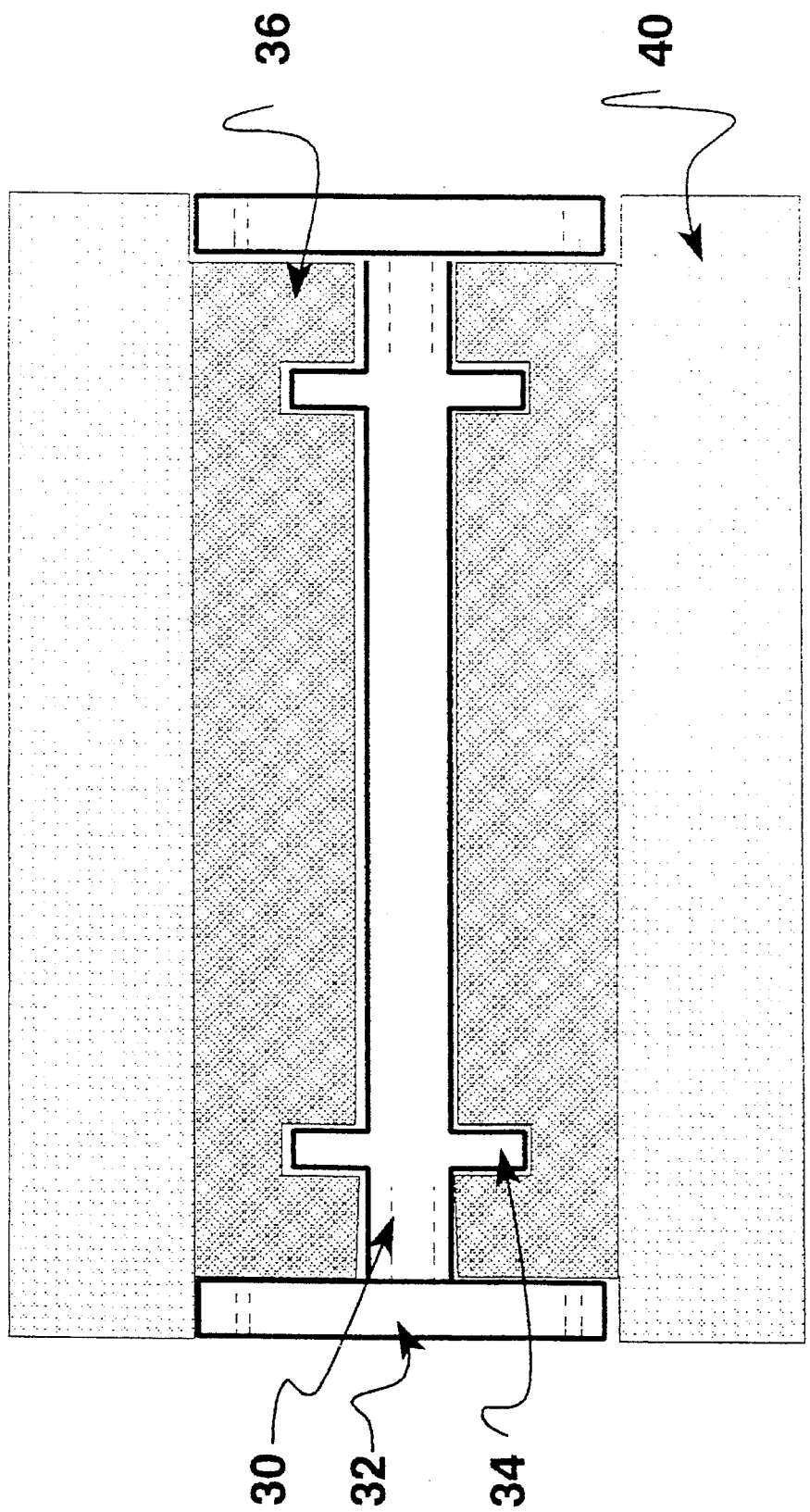
FIG. 3 is a conceptual design of an amorphous bearing.

A simple design geometry from these requirements would be a simple cylindrical shaft and bushing that also could include thrust plates such as shown in FIG. 3. The bearing 20 is made up of the amorphous shaft 30, which has shaft coupling plates 32 at each end. The thrust plates 34 serve to keep the shaft in position. Surrounding the shaft is the bushing 36 also made of the amorphous material. The bushing and shaft are mounted in a housing 40 made of a host material.

Figure 4:
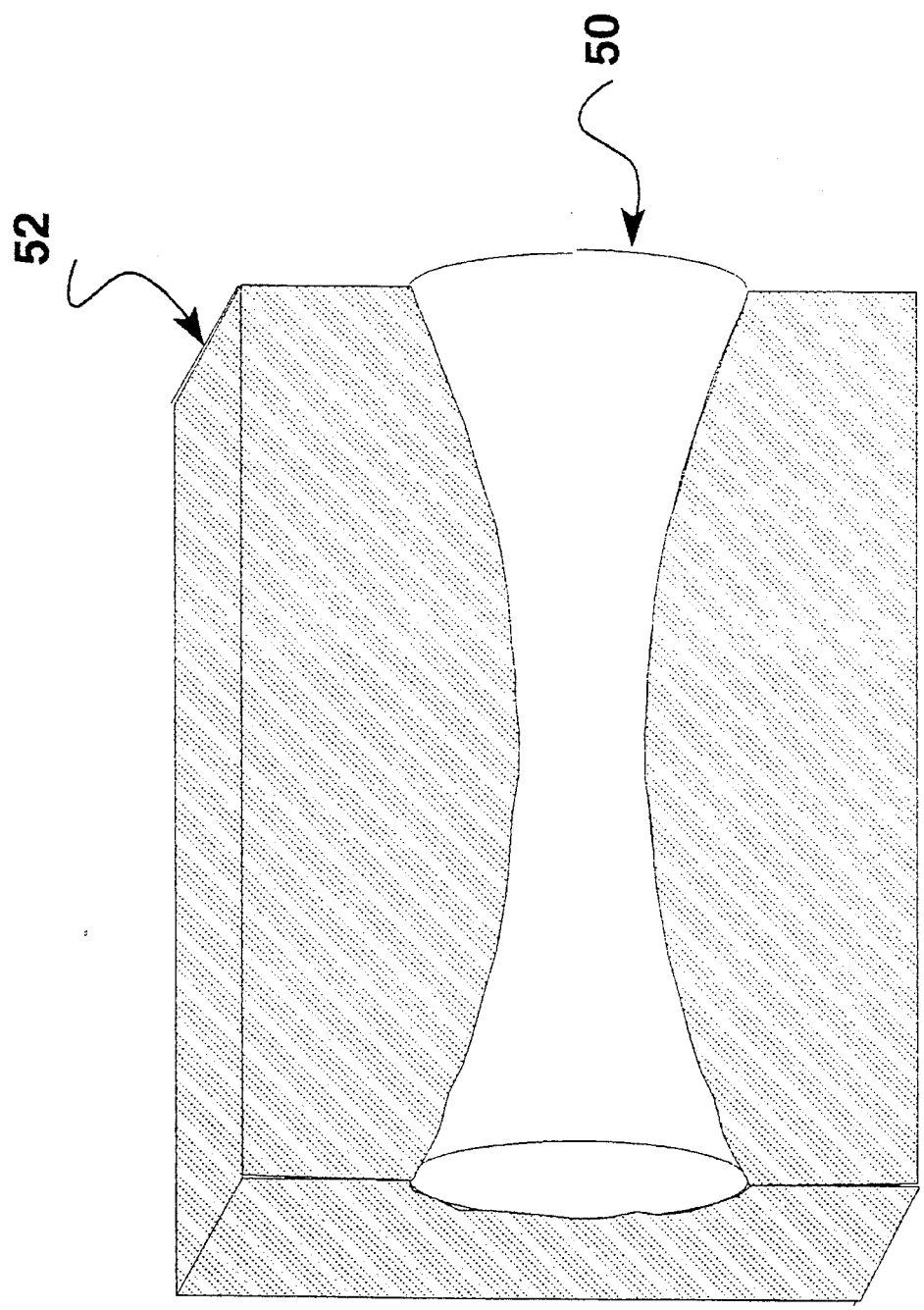
FIG. 4 is a sectional view of an amorphous metal bearing housing.
Figure 5:
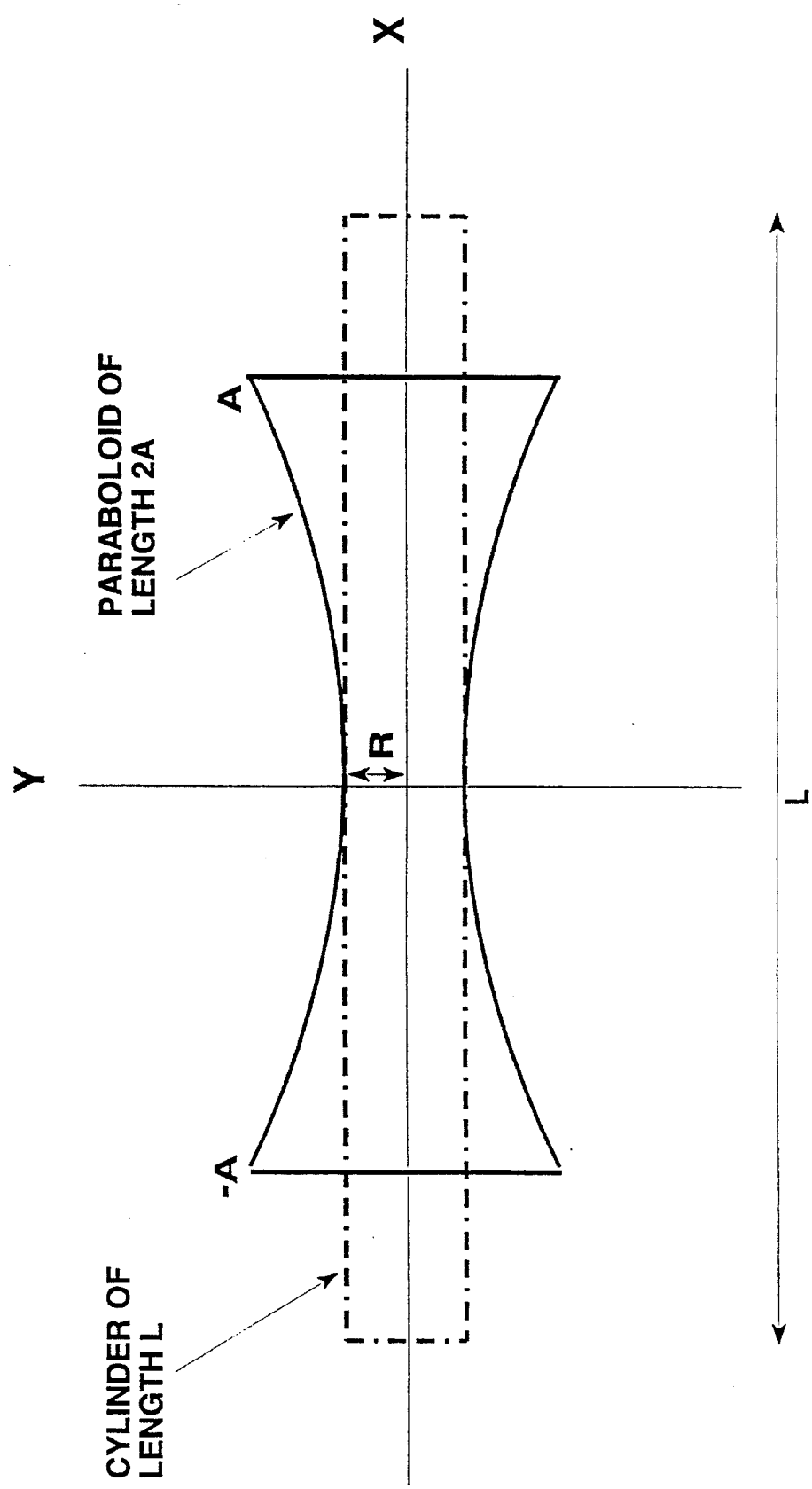
FIG. 5 is a sectional view of a cylinder and paraboloid.

The geometry in FIG. 3 can be improved to allow for larger distribution of thrust forces and for improved alignment of the shaft within the bearing housing. To demonstrate that this departure from the conventional cylindrical geometry is still equivalent to cylindrical as regards material and structural performance, the following analysis is made. The ideal geometry for this improved configuration is a paraboloid as seen in FIG. 4.

Fabrication of the bearing using injection molding is possible by first molding the paraboloid shaft. By virtue of the large ΔT between glassification and crystalization temperatures, coupled with the low material coefficient of expansion, the bearing housing can be molded around the shaft. This in-situ molding process will result in a perfectly matched shaft/housing assembly.

To ensure that the paraboloid is equivalent in geometry to the cylinder, the parabolic solid of revolution must have the same volume as the cylindrical shaft. This can be satisfied as follows:
The planeform parabolic shape is given by the standard conic section:

$$Y=KX^2+R$$

where R, the displacement above the X-axis, is identical to the proposed radius of the cylindrical shaft, and
K is the inverse length of the latus rectum (chord through the parabola focal point) and should be kept as long as possible to maintain a geometry near to that of a cylinder.

The volume of the parabola rotated about the X-axis is:

$$V=\pi \int Y^2 dX$$

The limits of integration will be −A to A $$=\pi[0.4k^2A^5+1.33KRA^3]$$

The maximum length of K can be found by solving dV/dX=0.
The maximum K is:

$$K=(5R)/(3A^2)$$

The value of A which is the base length of the paraboloid can be found in terms of the shaft length of the original cylindrical shaft by equating the volume of the paraboloid with the volume of the cylinder and solving for A. The formula becomes:

$$A=L/3.33$$

$$SoK=18.48R/L^2$$

Thus a paraboloid shaft having the same mass and equivalent to the cylindrical shaft in material performance will be roughly one third the length of the cylindrical shaft while maintaining an eccentricity as flat as possible. However, for larger thrust requirements, the K value can be increased which will cause a more rapid departure from a "near-cylindrical" flatness.

The present materials possess an intrinsically low coefficient of friction on the order of a ball bearing and have the strength of a journal bearing. These materials require no organic lubrication, have low friction loss, and provide a high load capacity bearing surface. This is possible without the trade-off of stress concentrations along the tangential contacts that are found in prior art balls and bearing races.

The 150° C. temperature difference between the plastic flow point and the crystalline state for the preferred alloy composition is an exceptionally good characteristic of this material in that the plastic flow point can be reached and maintained with existing temperature control technology without the threat of crystallization. If the crystallization temperature of the material is reached, then the material is no longer amorphous or injection moldable. Having such a large temperature range between these two states virtually eliminates the concern for crystallization and allows for large quantities of the material to be maintained ready for molding. However, using precise temperature control would allow for processing of an amorphous material of a material with a ΔT of less than or equal to 10° C. When manufacturing costs need to be reduced materials can be selected that have a ΔT of at least about 50° C. and most preferably at least about 140° C.

The preferred amorphous alloy has an inherently low shrinkage during the transition to and while in the metastable state. This low shrinkage is believed to be a function of the low coefficient of thermal expansion. This permits in-situ molding of the shaft and housing with shaft/housing clearances which are less than or equal to 0.001 inch.

Another exceptionally desirable characteristic of the material is the inherently low coefficient of thermal expansion during the molding process. For the preferred material the coefficient is about $4\times10^{-6}$ at 75° K. and $12\times10^{-6}$ at 550° K. This allows for near net shape molding which may eliminate the need for machining. Elimination of the requirement for precision machining of bearing surfaces will significantly lower the production costs associated with close tolerance bearing surfaces and will simultaneously increase the manufacturing rate.

It is understood that the foregoing detailed description is given merely by way of illustration and that many variations may be made therein without departing from the spirit of this invention.

What is claimed is:

1. A bearing having at least one surface made of an amorphous alloy having a coefficient of friction of less than 0.5, having a crystallization temperature lower than 497° C. and having a tensile strength of 1.0 GPa or greater.

2. A bearing according to claim 1, wherein the tensile strength is at least 1.4 GPa.

3. A bearing according to claim 1, wherein the coefficient of friction is less than 0.2.

4. A bearing according to claim 1, wherein the shear modulus is at least 30 GPa.

5. A bearing according to claim 1, wherein the Youngs modulus is at least 80 Gpa.

6. A bearing according to claim 1, wherein the amorphous metal is moldable at a plastic flow temperature which is less than the crystallization temperature.

7. A bearing according to claim 1, wherein the amorphous alloy is homogeneous and isotropic with no significant defects so as to be resistance to cracking and to failure under load.

8. A bearing according to claim 7, wherein the amorphous alloy is homogeneous and isotropic with no dislocations, inclusions, or grain boundaries so as to be resistance to cracking and to failure under load.

9. A bearing according to claim 1, wherein both surfaces of the bearing are made of the amorphous alloy.

10. A bearing according to claim 1, wherein the amorphous alloy comprises an alloy having the formula

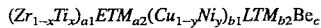

where x and y are atomic fractions, and a1, a2, b1, b2 and c are atomic percentages, and wherein:

ETM is at least one early transition metal selected from the group consisting of V, Nb, Hf and Cr, wherein the atomic percentage of Cr is not more than 0.2 a1;

LTM is a late transition metal selected from the group consisting of Fe, Co, Mn, Ru, Ag and Pd;

a2 is in the range of from 0 to 0.4a1;

x is in the range of from 0 to 0.4; and y is in the range of from 0 to 1; and (A) when x is in the range of from 0 to 0.15;
(a1+a2) is in the range of from 30 to 75%,
(b1+b2) is in the range of from 5 to 62%,
b2 is in the range of from 0 to 25%, and
c is in the range of from 6 to 47%; and (B) when x is in the range of from 0.15 to 0.4;
(a1+a2) is in the range of from 30 to 75%,
(b1+b2) is in the range of from 5 to 62%,
b2 is in the range of from 0 to 25%, and
c is in the range of from 2 to 47%.

11. A bearing according to claim 1, wherein the amorphous alloy is $Zr_{41}Ti_{14}Cu_{13}Ni_{10}Be_{22}$.

12. A bearing according to claim 1, wherein the bearing contains no organic lubricant.

13. A bearing according to claim 1, wherein the amorphous alloy When heated to a temperature above the plastic flow temperature and cooled to its normal metastable state has an inherently low shrinkage during the transition to and while in the metastable state.

14. A bearing according to claim 1, wherein the bearing has a shaft and said shaft is in the form of a parabola of revolution.

15. A bearing according to claim 1, wherein the amorphous alloy comprises an alloy having the formula

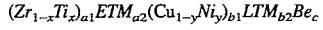

where x and y are atomic fractions, and a1, a2, b1, b2 and c are atomic percentages, and wherein:

ETM is at least one early transition metal selected from the group consisting of V, Nb, Hf and Cr, wherein the atomic percentage of Cr is not more than 0.2a1;

LTM is a late transition metal selected from the group consisting of Fe, Co, Mn, Ru, Ag and Pd;

a2 is in the range of from 0 to 0.4a1;

x is in the range of from 0.4 to 1; and y is in the range of from 0 to 1; and (A) when x is in the range of from 0.4to 0.6;
(a1+a2) is in the range of from 35 to 75%,
(b1+b2) is in the range of from 5 to 52%,
b2 is in the range of from 0 to 25%, and
c is in the range of from 5 to 47%;

(B) when x is in the range of from 0.6 to 0.8;
(a1+a2) is in the range of from 38 to 75%,
(b1+b2) is in the range of from 5 to 52%,
b2is in the range of from 0 to 25%, and
c is in the range of from 5 to 42%; and (C) when x is in the range of from 0.8 to 1;
(a1+a2) is in the range of from 38 to 75%,
(b1+b2) is in the range of from 5 to 52%,
b2 is in the range of from 0 to 25%, and
c is in the range of from 5 to 30%,
under the constraint that 3c is up to (100–b1–b2) when (b1+b2) is in the range of from 10 to 43.

16. In a structure having two surfaces in moving frictional contact, the improvement comprising providing at least one of the surfaces with an amorphous alloy having a coefficient of friction of less than about 0.5 and having a high tensile strength of about 1.0 GPa or greater.

17. A structure according to claim 16, wherein the amorphous alloy comprises an alloy having the formula

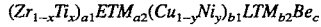

where x and y are atomic fractions, and a1, a2, b1, b2 and c are atomic percentages, and wherein:

ETM is at least one early transition metal selected from the group consisting of V, Nb, Hf and Cr, wherein the atomic percentage of Cr is not more than 0.2 a1;

LTM is a late transition metal selected from the group consisting of Fe, Co, Mn, Ru, Ag and Pd;

a2 is in the range of from 0 to 0.4 a1;

x is in the range of from 0 to 0.4; and y is in the range of from 0 to 1; and (A) when x is in the range of from 0 to 0.15;
(a1+a2) is in the range of from 30 to 75%,
(b1+b2) is in the range of from 5 to 62%,
b2 is in the range of from 0 to 25%, and
c is in the range of from 6 to 47%; and (B) when x is in the range of from 0.15 to 0.4;
(a1+a2) is in the range of from 30 to 75%,
(b1+b2) is in the range of from 5 to 62%,
b2 is in the range of from 0 to 25%, and
c is in the range of from 2 to 47%.

18. A structure according to claim 16, wherein the amorphous alloy comprises an alloy having the formula

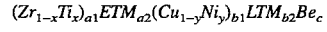

where x and y are atomic fractions, and a1, a2, b1, b2 and c are atomic percentages, and wherein:

ETM is at least one early transition metal selected from the group consisting of V, Nb, Hf and Cr, wherein the atomic percentage of Cr is not more than 0.2 a1;

LTM is a late transition metal selected from the group consisting of Fe, Co, Mn, Ru, Ag and Pd;

a2 is in the range of from 0 to 0.4 a1;

x is in the range of from 0.4 to 1; and y is in the range of from 0 to 1; and
(A) when x is in the range of from 0.4 to 0.6;
   (a1+a2) is in the range of from 35 to 75%,
   (b1+b2) is in the range of from 5 to 52%,
   b2 is in the range of from 0 to 25%, and
   c is in the range of from 5 to 47%;
(B) when x is in the range of from 0.6 to 0.8;
   (a1+a2) is in the range of from 38 to 75%,
   (b1+b2) is in the range of from 5 to 52%,
   b2 is in the range of from 0 to 25%, and
   c is in the range of from 5 to 42%; and
(C) when x is in the range of from 0.8 to 1;
   (a1+a2) is in the range of from 38 to 75%,
   (b1+b2) is in the range of from 5 to 52%,
   b2 is in the range of from 0 to 25%, and
   c is in the range of from 5 to 30%,
   under the constraint that $3c$ is up to (100−b1−b2) when (b1+b2) is in the range of from 10 to 43.

19. A method of making an article of an amorphous alloy having a coefficient of friction of less than about 0.5 and having a high tensile strength of about 1.0 GPa or greater comprising:
   (a) heating an amorphous metal to a temperature above its plastic flow temperature and below its crystallization temperature so that it is flowable;
   (b) molding or forming the heated flowable material into a desired shape; and
   (c) cooling the molded amorphous metal article to its metastable state.

20. A method according to claim 19, where the ΔT between the plastic flow temperature and the crystallization temperature is at least about 50° C.

21. A method according to claim 20, where the ΔT is at least about 140° C.

22. A method according to claim 19, wherein the amorphous metal comprises an alloy having the formula

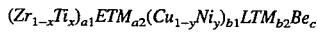

where x and y are atomic fractions, and a1, a2, b1, b2 and c are atomic percentages, and wherein:
   ETM is at least one early transition metal selected from the group consisting of V, Nb, Hf and Cr, wherein the atomic percentage of Cr is not more than 0.2 a1;
   LTM is a late transition metal selected from the group consisting of Fe, Co, Mn, Ru, Ag and Pd;
   a2 is in the range of from 0 to 0.4 a1;
   x is in the range of from 0 to 0.4; and
   y is in the range of from 0 to 1; and
   (A) when x is in the range of from 0 to 0.15;
      (a1+a2) is in the range of from 30 to 75%,
      (b1+b2) is in the range of from 5 to 62%,
      b2 is in the range of from 0 to 25%, and
      c is in the range of from 6 to 47%; and
   (B) when x is in the range of from 0.15 to 0.4;
      (a1+a2) is in the range of from 30 to 75%,
      (b1+b2) is in the range of from 5 ;to 62%,
      b2 is in the range of from 0 to 25%, and
      c is in the range of from 2 to 47%.

23. An amorphous alloy article made by the method of claim 22.

24. A method according to claim 19, wherein the amorphous metal is $Zr_{41}Ti_{14}Cu_{13}Ni_{10}Be_{22}$.

25. An amorphous alloy article made by the method of claim 24.

26. An amorphous alloy article made by the method of claim 19.

27. A method according to claim 19, wherein the amorphous metal comprises an alloy having the formula

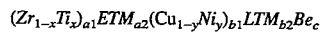

where x and y are atomic fractions, and a1, a2, b1, b2 and c are atomic percentages, and wherein:
   ETM is at least one early transition metal selected from the group consisting of V, Nb, Hf and Cr, wherein the atomic percentage of Cr is not more than 0.2 a1;
   LTM is a late transition metal selected from the group consisting of Fe, Co, Mn, Ru, Ag and Pd;
   a2 is in the range of from 0 to 0.4a1;
   x is in the range of from 0.4 to 1; and
   y is in the range of from 0 to 1; and
   (A) when x is in the range of from 0.4 to 0.6;
      (a1+a 2) is in the range of from 35 to 75%,
      (b1+b2) is in the range of from 5 to 52%,
      b2 is in the range of from 0 to 25%, and
      c is in the range of from 5 to 47%;
   (B) when x is in the range of from 0.6 to 0.8;
      (a1+a2) is in the range of from 38 to 75%,
      (b1+b2) is in the range of from 5 to 52%,
      b2 is in the range of from 0 to 25%, and
      c is in the range of from 5 to 42%; and
   (C) when x is in the range of from 0.8 to 1;
      (a1+a2) is in the range of from 38 to 75%,
      (b1+b2) is in the range of from 5 to 52%,
      b2 is in the range of from 0 to 25%, and
      c is in the range of from 5 to 30%,
      under the constraint that $3c$ is up to (100−b1−b 2) when (b1+b2) is in the range of from 10 to 43.

28. An amorphous alloy article made by the method of claim 27.

* * * * *